(12) United States Patent
Agarwal et al.

(10) Patent No.: US 10,939,302 B2
(45) Date of Patent: Mar. 2, 2021

(54) COMPUTING SYSTEM TO CREATE RADIO FREQUENCY PLANS FOR WIRELESS NETWORK DEPLOYMENTS

(71) Applicant: HEWLETT PACKARD ENTERPRISE DEVELOPMENT LP, Houston, TX (US)

(72) Inventors: Gopal Agarwal, Karnataka (IN); Gopal Gupta, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/176,636

(22) Filed: Oct. 31, 2018

(65) Prior Publication Data

US 2020/0137585 A1    Apr. 30, 2020

(51) Int. Cl.
*H04W 40/00* (2009.01)
*H04W 16/18* (2009.01)
*G06N 20/00* (2019.01)

(52) U.S. Cl.
CPC ............ *H04W 16/18* (2013.01); *G06N 20/00* (2019.01)

(58) Field of Classification Search
CPC . H04W 12/0023; H04W 12/04; H04W 12/08; H04W 36/22; H04W 4/50; H04W 84/045; H04W 88/08; H04W 88/18; H04W 8/245; H04W 92/20; H04W 4/023; H04W 12/0013; H04W 12/10; H04W 4/02; H04W 4/06; H04W 4/20; H04W 4/80; H04W 76/14; H04W 84/18; H04W 88/02

USPC ...... 455/416, 509, 414.1, 456.1, 446, 456.6, 455/423, 450; 707/769
See application file for complete search history.

(56) References Cited

U.S. PATENT DOCUMENTS 6,008,808 A * 12/1999 Almeida ............... G06F 16/904
                                                       715/767
6,356,758 B1 * 3/2002 Almeida ............... H04W 16/18
                                                       455/422.1

(Continued)

OTHER PUBLICATIONS

Cisco details RF planning for enterprise wireless networks, (Web Page), Retrieved Aug. 14, 2018, 5 Pgs.

(Continued)

*Primary Examiner* — Joseph Arevalo
(74) *Attorney, Agent, or Firm* — Nolte Lackenbach Siegel (57) ABSTRACT

The present disclosure provides an improved computing system to determine a suitability of a RF plan and a dynamic wireless network system. The method includes receiving uploads of RF plans associated with wireless network deployments which provided wireless network capability throughout each respective deployment area. Further, storing the uploaded RF plans with in a network storage cloud. In addition, training a predictive model with the stored uploaded RF plans. The dynamic wireless network system disclosed herein includes a plurality of internet-of-things devices within a deployment area. The system further includes at least one network device communicatively coupled to each of the plurality of internet-of-things devices, wherein the at least one network device has access to a trained predictive model that is to determine a number of access points and a layout of the access points within the deployment area based on a set of characteristics associated with the deployment area.

15 Claims, 5 Drawing Sheets

(56) References Cited

U.S. PATENT DOCUMENTS

| | | | |
|---|---|---|---|
| 7,047,014 B1 * | 5/2006 | Friday | H04W 16/18 345/581 |
| 7,574,202 B1 * | 8/2009 | Tsao | H04L 63/0272 455/411 |
| 7,711,360 B2 | 5/2010 | Dundar et al. | |
| 8,077,090 B1 * | 12/2011 | Chintalapudi | G01S 11/06 342/450 |
| 8,577,381 B2 | 11/2013 | Kalika et al. | |
| 8,825,865 B2 * | 9/2014 | Anderson | H04W 16/04 370/389 |
| 9,191,831 B2 * | 11/2015 | Giannakis | H04W 24/02 |
| 9,826,413 B1 * | 11/2017 | Abid | G07C 5/008 |
| 2004/0203855 A1 * | 10/2004 | Veerasamy | H04W 16/18 455/456.1 |
| 2005/0003827 A1 * | 1/2005 | Whelan | H04W 16/10 455/454 |
| 2005/0020284 A1 * | 1/2005 | Benco | H04W 16/18 455/456.6 |
| 2006/0019679 A1 * | 1/2006 | Rappaport | G01S 5/0252 455/456.5 |
| 2007/0060150 A1 * | 3/2007 | Hart | H04W 16/32 455/446 |
| 2007/0082677 A1 * | 4/2007 | Donald Hart | H04W 16/18 455/456.1 |
| 2013/0185024 A1 | 7/2013 | Mahasenan et al. | |
| 2014/0295813 A1 * | 10/2014 | Grech | H04W 16/18 455/418 |
| 2014/0323138 A1 | 10/2014 | Kamalakannan | |
| 2015/0358910 A1 * | 12/2015 | Tillman | H04L 1/0027 370/311 |
| 2017/0280379 A1 * | 9/2017 | Axmon | H04W 48/14 |
| 2018/0069932 A1 | 3/2018 | Tiwari et al. | |
| 2018/0242178 A1 * | 8/2018 | Barton | H04W 24/08 |
| 2018/0352473 A1 * | 12/2018 | Gunasekara | H04W 48/16 |

OTHER PUBLICATIONS

Predictive Radio Frequency Planning, (Web Page), Sep. 4, 2014, 10 Pgs.

ZonePlanner Wi-Fi RF Simulation Tool, (Web Page), Retrieved Sep. 11, 2018, 2 Pgs.

* cited by examiner

COMPUTING SYSTEM TO CREATE RADIO FREQUENCY PLANS FOR WIRELESS NETWORK DEPLOYMENTS

BACKGROUND

New wireless network deployments generally involve the need for an IT administrator to survey a deployment area to identify a suitable number of access point (AP) devices and their layout within a deployment area to best provide wireless capability therein. Simply put, this RF process (e.g., RF planning) includes assigning frequencies, transmitter locations, and parameters of network devices within a wireless communications system to provide sufficient coverage and capacity for the network services required.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION

The description of the different advantageous implementations has been presented for purposes of illustration and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

Before the present disclosure is described in detail, it is to be understood that, unless otherwise indicated, this disclosure is not limited to specific procedures or articles, whether described or not. It is further to be understood that the terminology used herein is for the purpose of describing particular implementations only and is not intended to limit the scope of the present disclosure.

It must be noted that as used herein, and in the claims, the singular forms "a," and "the" include plural referents unless the context clearly dictates otherwise.

For new wireless network deployments, an IT administrator (e.g., a radio frequency (RF) planner)) may manually survey a deployment area with RF equipment to identify the number of access points (AP) needed and their layout within the deployment area. Oftentimes, RF planning occurs before a deployment area is furnished with electrical equipment which emit radio waves (e.g., wireless phones, microwaves, etc.) and the interior of the deployment area may be altered during final stages. Moreover, manually surveying a deployment area may lead to errors which may affect the quality of the wireless network system.

As such, the manual radio frequency (RF) planning process is manual therefore error-prone. After a manual RF plan is generated, a first deployment ensues which generally requires a redo of a proposed RF plan. Errors may occur due to an overall change to a deployment area such as the addition of new equipment or an under-estimation of user density within the deployment area. Accordingly, there exists a need for an efficient and cost-effective method to generate a reliable RF plan.

The present disclosure can be implemented to determine the optimum number and layout of network devices (e.g., access points (APs)) needed for successful wireless network system deployments in a time-efficient manner such that IT administrators (e.g., RF planner) can reduce a number of visits previously required to a deployment area. Although the present disclosure may be described in reference to determining the optimal number of access points and their layout within a deployment area, the present disclosure is not limited thereto. Accordingly, the present disclosure may be employed to determine the number, type, and layout of any network devices within a deployment area. Moreover, for sub-optimal or low-cost deployments, software-generated RF plans may be sufficient thereby eliminating the need for manual RF planning.

The present disclosure provides an improved computing device to determine a suitability of a RF plan and a dynamic network management system. The method begins with receiving input into a trained predictive model. Herein, a trained predictive model is defined as an application (e.g., software application) that is trained with data using a supervised learning method.

The received input may comprise a set of characteristics and attributes associated with a deployment area which is to host a deployment of a wireless network system. Next, employing the trained predictive model to determine the suitability of a RF plan based on the received input. Further, outputting a result (e.g., prediction) of the employed trained predictive model.

In addition, the present disclosure provides a dynamic network management system that includes internet-of-things (IoT) network devices within a deployment area. Additionally, the network management system includes one or more management network devices communicatively coupled to each IoT device on a network. The network devices may have access to a trained predictive model that can determine a number of access points and their layout within the deployment area based on a set of characteristics and attributes associated with the deployment area. In some implementations, the layout of the APs within the deployment area includes the quadrant in which the AP(s) are located in the deployment area. In some implementations, the layout of the APs includes coordinates within a two-dimensional or three-dimensional coordinate system.

Figure 1:
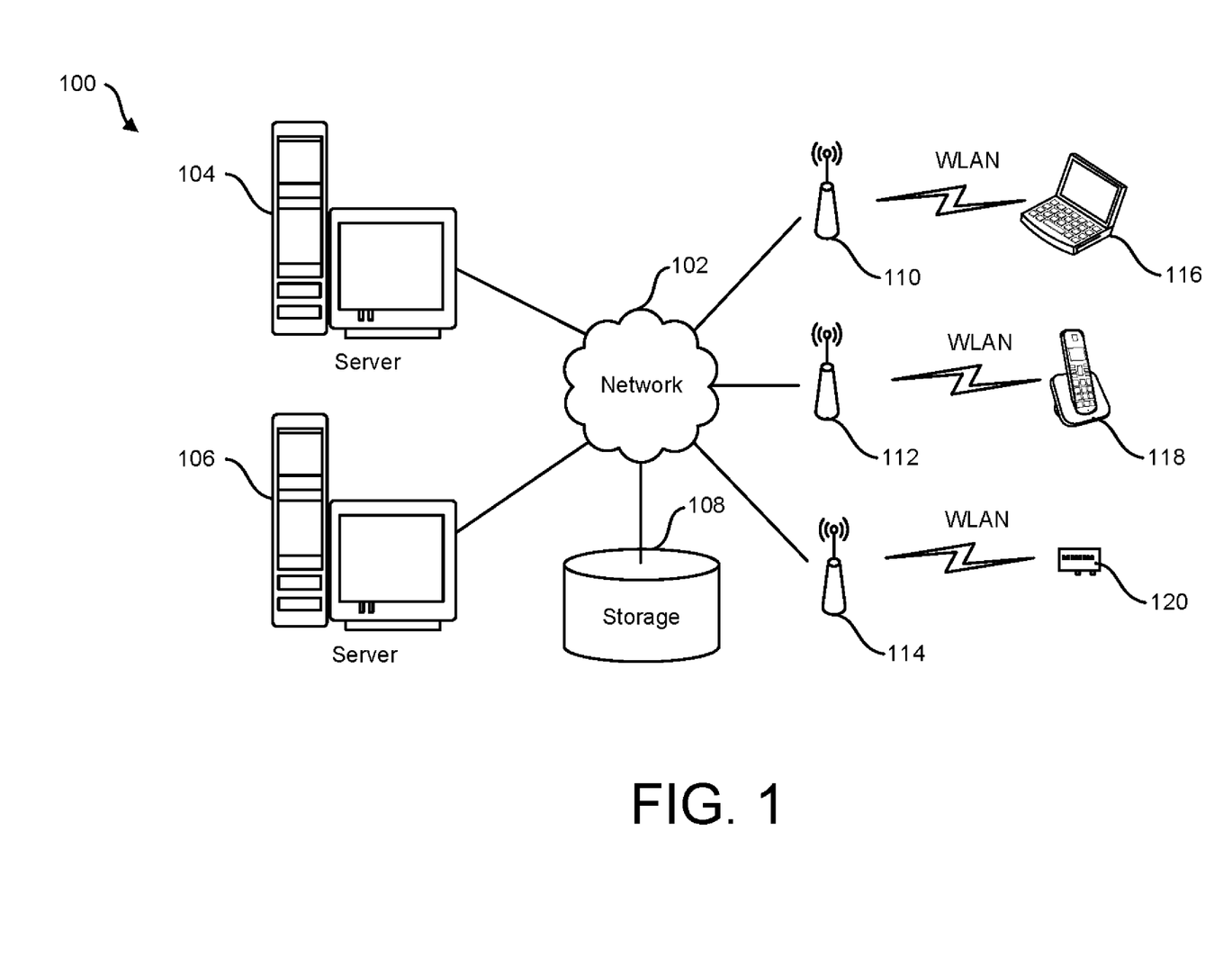
FIG. 1 is an example network management system in which illustrative implementations may be implemented according to one implementation of the present disclosure.

Turning now to the drawings, FIG. 1 is an example network management system 100 in which illustrative implementations may be implemented according to one implementation of the present disclosure. Network management system 100 is a network of data processing systems, such as, for example, computers and other devices, in which the illustrative implementations may be implemented. Furthermore, computing device employed within network management system 100 may include a display screen, a plurality of microprocessors, and memory.

Network data processing system 100 may include one or more networks 102 which provide communication links between the various computers and other devices connected together within the network data processing system 100. In some implementations, network 102 may include connections, such as wire(s), wireless communication links, or fiber optic cables.

In the depicted example, server 104, server 106, and storage unit 108 are all connected to network 102. Storage unit 108 represents any type that is capable of storing data in a structured or unstructured format. Additionally, storage unit 108 may represent a plurality of storage units coupled to network 102. In some implementations of the present disclosure, storage unit 108 may, for example, be any database within an enterprise that stores and manages reusable software assets and any other data related to these reusable software assets. APs 110, 112, and 114 are also shown connected to network 102.

An AP may be a network device that allows a client device to connect to a wired network. In some implementations, an AP may connect to a router as a standalone device but may also be an integral component of the router itself in some implementations.

In addition, the APs 110, 112, 114 may provide wireless access to client devices 116, 118, 120. The client devices may include personal computers, network computers, laptop computers, hand-held computers, personal digital assistants (PDAs), or smart cellular telephones (e.g., smartphones). However, one having ordinary skill in the art should appreciate that the type of client devices is not limited to the aforementioned devices.

In the implementation shown, APs 110, 112, and 114 are clients to server 104 and/or server 106. In addition, server 104 and/or server 106 may provide data, such as, for example, boot files, operating system images, and applications to APs 110, 112, and 114. In an example implementation, servers 104, 106 include or have access to a machine-learning software application 125 that can receive an input of a set of characteristics or attributes associated with a proposed RF plan and determines whether the proposed RF plan would provide sufficient wireless services within the deployment area. Moreover, network management system 100 may include additional servers, clients, and other devices not shown to implement processes of illustrative implementations.

Network management system 100 may be implemented as a number of different types of networks, such as, for example, an intranet, a local area network (LAN), a wide area network (WAN), or the Internet. Also, it should be noted that FIG. 1 is only intended as an example and not as an architectural limitation for the different illustrative implementations. For example, illustrative implementations may be implemented within a single data processing system or within a network data processing system.

Figure 2:
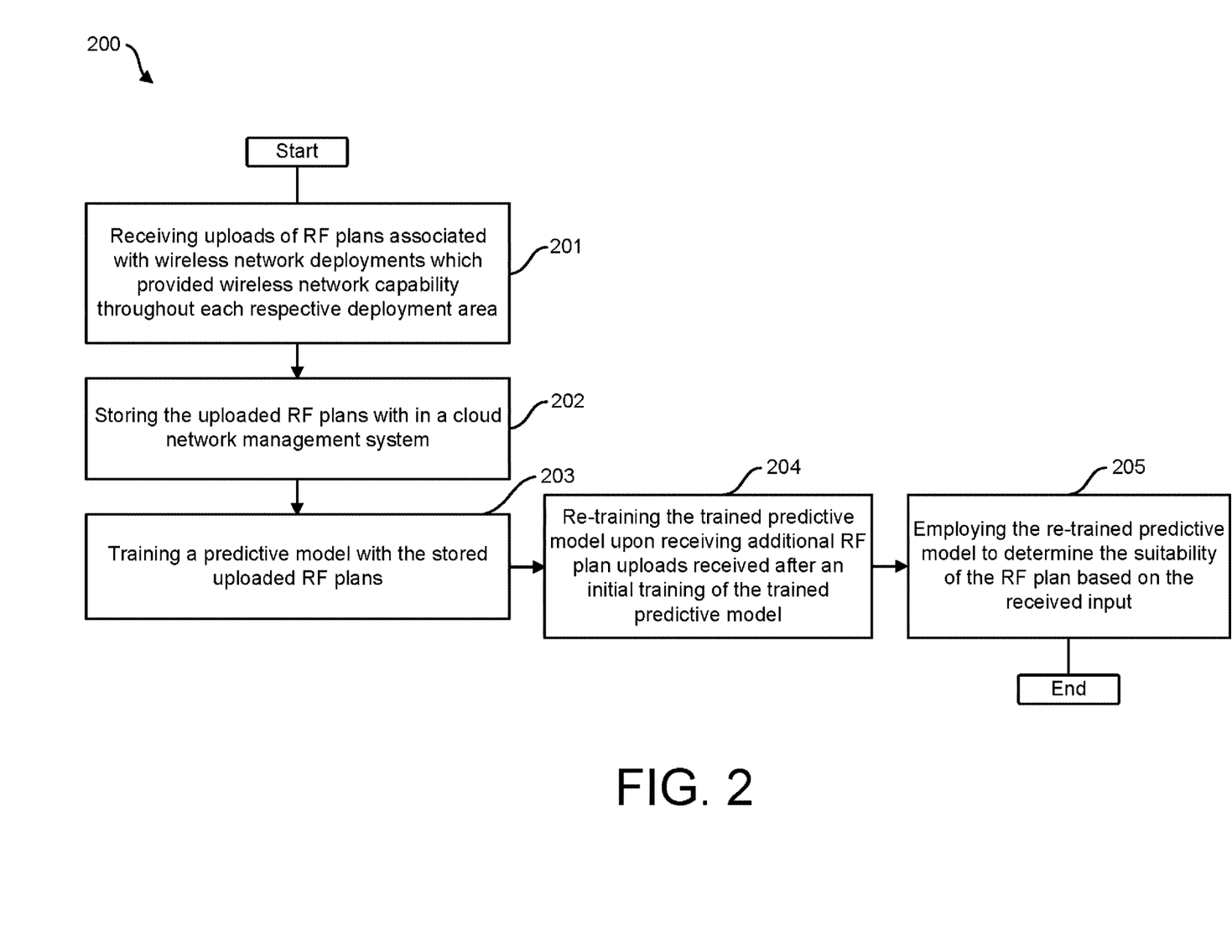
FIG. 2 is a flowchart of a method for training a predictive model to generate predictions regarding the suitability of proposed RF plans.

FIG. 2 is a flowchart of a method 200 for training a machine-learning application to generate predictions regarding the suitability of proposed RF plans. Herein, machine-learning employs statistical techniques to provide computer systems with the ability to learn from data without being explicitly programmed. Moreover, machine-learning can be used to devise complex models and algorithms that lend themselves to predictive analytics.

Method 200 begins with receiving uploads of RF plans associated with wireless network deployments which provided wireless network capability throughout each respective deployment area (block 201). In one or more implementations, the uploaded RF plans may be uploaded to a server by RF planners, IT administrators, and other professionals. For example, a community of RF planners may upload their RF plans associated with successful wireless network system deployments to the network management system.

Next, the method 200 may include storing the uploaded RF plans with in a network storage cloud (block 202). The uploaded RF plans may be stored in one or more servers. In some implementations, the RF plans are anonymized such that the source of the RF plans are unknown to subsequent users of the trained predictive model. For example, the RF plans may be stripped of addresses, names, and other indicia of ownership. Furthermore, attributes associated with each successful uploaded RF plan may be obtained and stored separately in a database. Accordingly, these attributes may be used for comparison in response to a query or employment of the trained predictive model.

The uploaded RF plans may be categorized. For example, the RF plans may be categorized according to deployment area type (e.g., homes, storage facility, office buildings, outside venues, etc.), user density (e.g., by number of client devices within the deployment area), etcetera. In some implementations, during the training process, only the RF plans associated with successful deployments for a particular deployment area type are included in the training. Likewise, in some implementations, only the RF plans associated with successful deployments are considered by the trained predictive model when determining the suitability of a proposed RF plan for a set of RF characteristics or attributes. The number of successful RF plans may be on an order of hundreds of thousands, millions, or tens of millions in some implementations. However, the trained predictive model may continue to "learn" based on the gradual uploads of successful RF plans.

Next, the method 200 may include training a predictive model with the stored uploaded RF plans (block 203). The predictive model may be trained in a manner consistent with conventional machine-learning applications and may implement any of various techniques such as, but not limited to, multi-variate regression, convolution neural networks, linear regression, logistic regression, decision tree, support vector machine, Naïve Bayes, k-nearest neighbors, or random forest algorithms. In some implementations, the trained predictive model may continue to be trained with new RF plan data that is uploaded to a network management system (e.g., cloud service). Accordingly, re-training the trained predictive model upon storing additional RF plans received after an initial training of the trained predictive model (block 204). As such, the trained predictive model can continue to fine tune upon receipt of new data.

For example, if the trained predictive model is trained with one million successful RF plans, the trained predictive model may be automatically employed when the aggregate number of training data doubles (e.g., two million successful RF plan uploads) from the occurrence of the previous training or last update. Employing the retrained predictive model to determine the suitability of the RF plan may be based on the received input (block 205). For instance, if the trained predictive model was employed to determine the suitability of the proposed RF plan based on its training with one million data sets, the trained predictive model may automatically generate an update regarding the suitability of a proposed RF plan once two million successful RF plans have been uploaded to the network management system.

Figure 3:
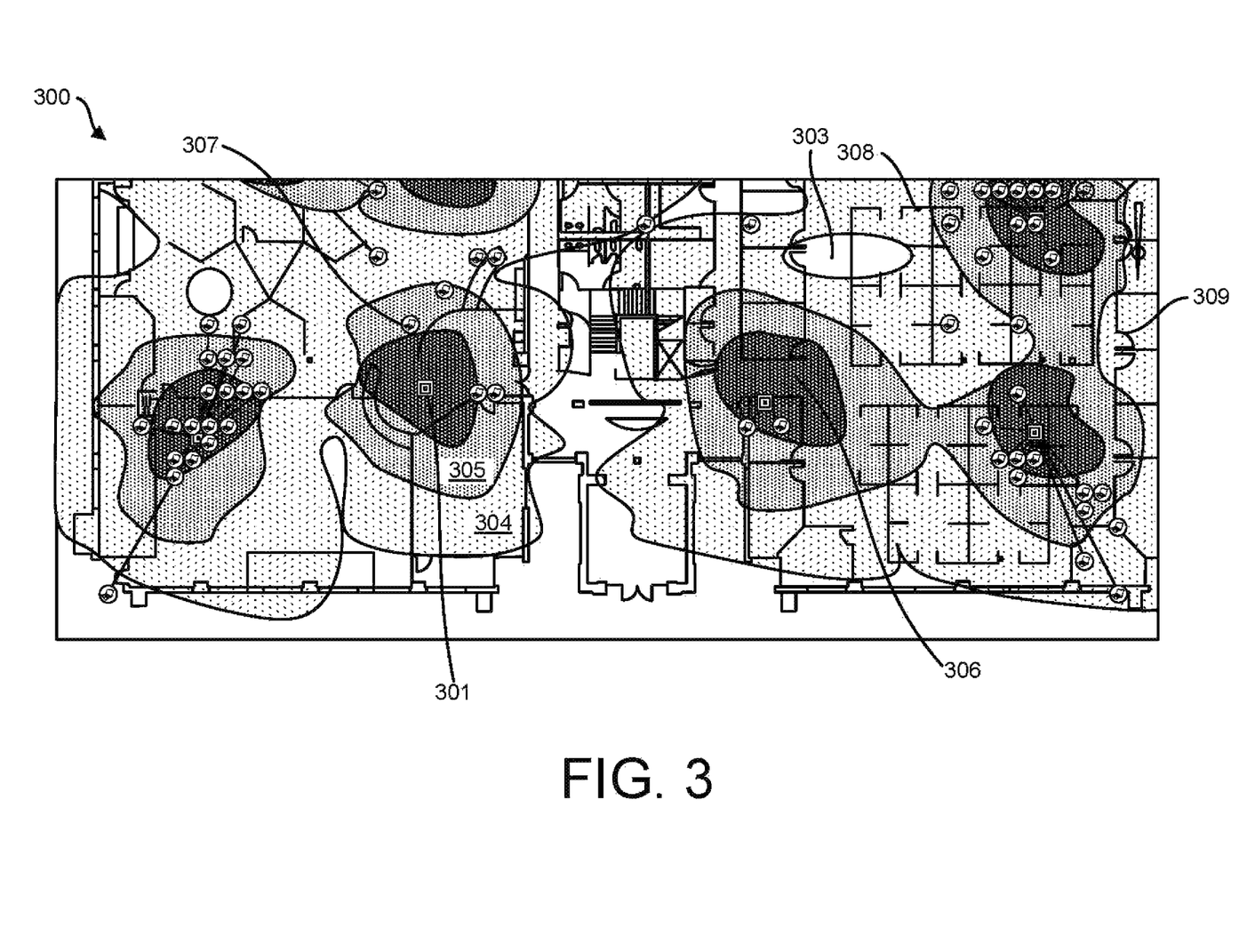
FIG. 3 is an illustration of an example RF map associated with a successful RF wireless network deployment according to one implementation of the present disclosure.

FIG. 3 is an illustration of an example RF map 300 associated with a successful RF wireless network deployment according to one implementation of the present disclosure. The exemplary RF map 300 includes heat region clusters which represent the user density in certain locations of the deployment area. RF map 300 may be representative of a floor plan of an office building which includes several building attributes (e.g., walls 308 and doors 309) and client devices 307. A RF map 300 may be uploaded to a network management system such that a trained predictive model can use the RF map 300 for a wireless network system to be deployed in a home, business, outside venue, etcetera. RF map 300 includes several APs 301 which show the layout of the APs devices 301 within the deployment area. Furthermore, the RF map 300 may indicate the type (e.g., model or rating) of the AP deployed.

The RF map 300 includes heat region clusters 303-306 that indicate user density within certain locations in the deployment area. In this example, the degree of darkness of in the shade of a heat region cluster corresponds positively to the user density of the wireless network within the corresponding deployment/coverage area. For example, heat region cluster 303 indicates a 30% user density of the wireless network system employed within the deployment area whereas heat region cluster 304 indicates a 30-50% user density of the wireless network system. Further, heat region cluster 305 indicates a 50-75% user density of a wireless network system and heat region cluster 306 indicates a 75-100% user density of the wireless network system. In other examples, different color schemes may be used to indicate the user density in a particular heat region cluster. The heat region cluster representation can be dynamically adjusted in real time.

In some implementations, RF plan 300 may be generated by a trained predictive model in response to its employment to determine the suitability of a proposed RF deployment plan. The generated RF plan may reveal in a visual format any limitations associated with a proposed RF plan. For example, the generated RF plan may include heat regions which graphically express under-utilization of some network devices and over-utilization of other network devices employed in a deployment area.

Figure 4:
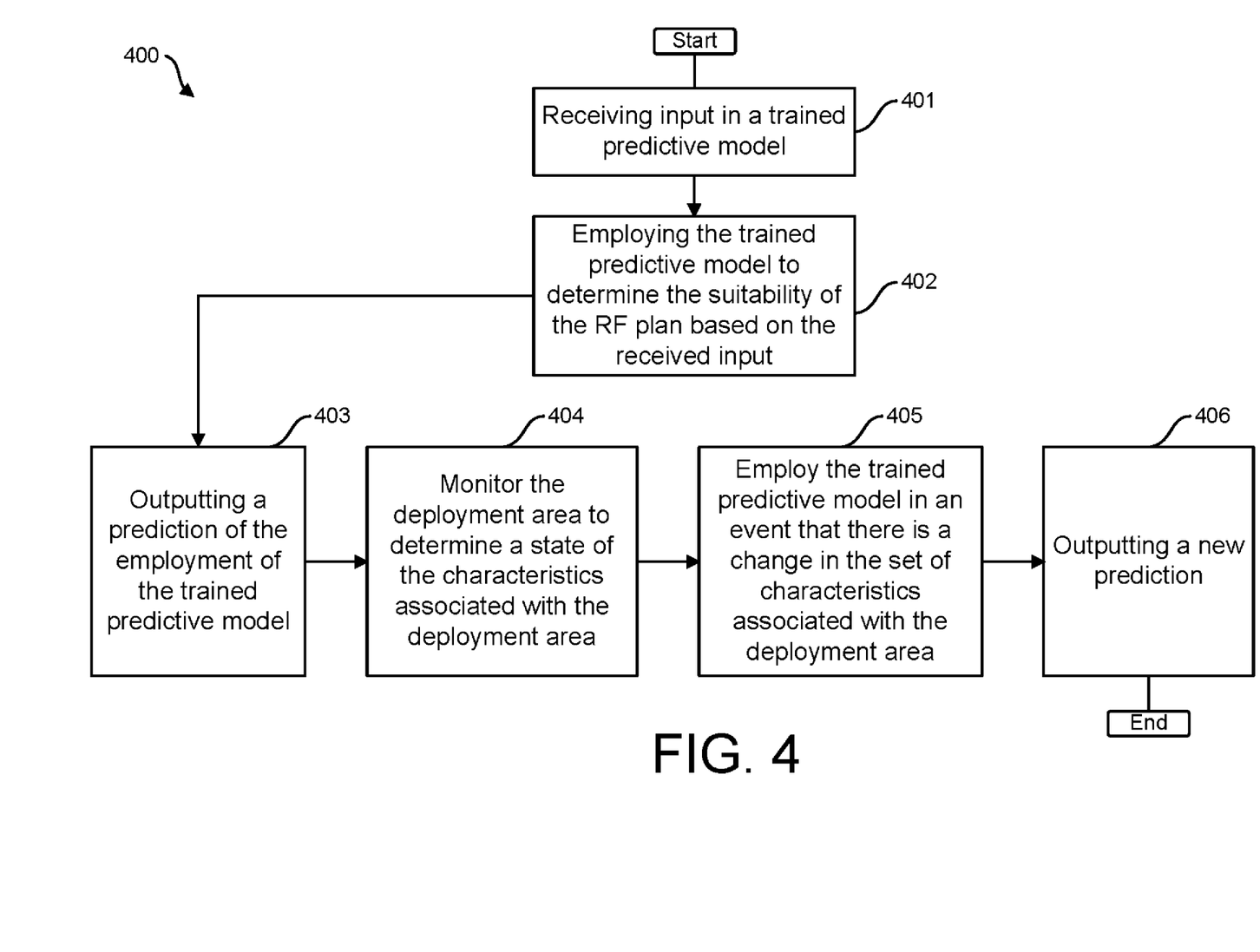
FIG. 4 is a flowchart of a method for determining the suitability of a radio frequency (RF) plan in accordance with one implementation of the present disclosure.

FIG. 4 is a flowchart 400 of a method for determining the suitability of a radio frequency (RF) plan in accordance with one implementation of the present disclosure. The method 400 begins with receiving input in a trained predictive model (block 401). The received input includes a set of characteristics and/or attributes associated with an area which is to host a deployment of a wireless network system.

The set of characteristics or attributes may include a target floor plan of the deployment area, a description of partitions within the deployment area, a target user density throughout the deployment area or specifically the target user density at particular locations within the deployment area, wall attributes (e.g., type, size, pore density, or thickness), ceiling(s) height, open areas (cubes, lounges, work areas, etc.), a target user density inside of the deployment area, and an amount of RF interference therein. The set of characteristics or attributes may be input manually by an IT administrator in some implementations or obtained from the submission of a proposed RF plan which may be stripped of relevant RF plan characteristics and attributes therefrom.

Further, the method 400 may include employing the trained predictive model to determine the suitability of the RF plan based on the received input (block 402). In some implementations, employing the trained predictive model includes making a prediction regarding the number, type, and layout of the APs needed for a successful wireless network deployment. In addition, the trained predictive model may perform a multi-variate regression method to determine the suitability of a proposed RF plan based on the received input.

Next, outputting a prediction of the employment of the trained predictive model (block 403). In some implementations, the outputted prediction includes a number of access points and proposed layout for them in the deployment area that will provide a successful deployment. For example, based on the set of characteristics submitted by an IT administrator as input into the trained predictive model, the trained predictive model may recommend that the deployment area needs three particular types (e.g., rating, brand, etc.) access points stationed in quadrants 1, 3, and 4 to ensure a successful wireless network system deployment.

As will be described below, fixtures, devices, or other items within an internet-of-things environment may be linked to a trained predictive model which may monitor the presence of IoT devices within the deployment area such that a change may lead to a new output regarding the suitability of an employed wireless network system. As such, the deployment area may be monitored to determine the state of the characteristic associated with the deployment area (block 404).

For example, many devices within a deployment area may be equipped with sensors such that they function as nodes within an internet-of-things environment. The IoT devices may send location, RF level, and other information to a network management system (e.g., by way of a network device). In some implementations, a network device is communicatively coupled to a trained predictive model and in the event that an IoT device is moved to a different location within the deployment area or from the deployment area all together, the trained predictive model can be implemented to generate an updated predictive analysis to determine whether the present number of APs, their type, and their present layout within the deployment area provides suitable wireless network coverage within the deployment area (block 405).

In some implementations, if the change in the set of characteristics or attributes render the present number of APs and their layout unsuitable with regard to an employed wireless network system, the trained predictive model may issue a notification to an administrator. In some implementations, the trained predictive model is implemented to generate a prediction of the number, type, and layout of APs for the deployment area with respect to the change in the set of characteristic or attributes.

In contrast, if the change in the set of characteristics and attributes renders the present number of APs superfluous, the trained machine model may send a notification to an administrator that one or more access points may be removed if the amount of wireless activity does not justify the present number of access points. In some implementations, the notifications are sent after the superfluous condition is sustained for a pre-determined period of time (e.g., weeks or months). As such, the network management system may generate updated prediction reports and output a new prediction (block 406) regarding the suitability of wireless network systems deployed after a change in the characteristics or attributes of the deployment area post launch.

Figure 5:
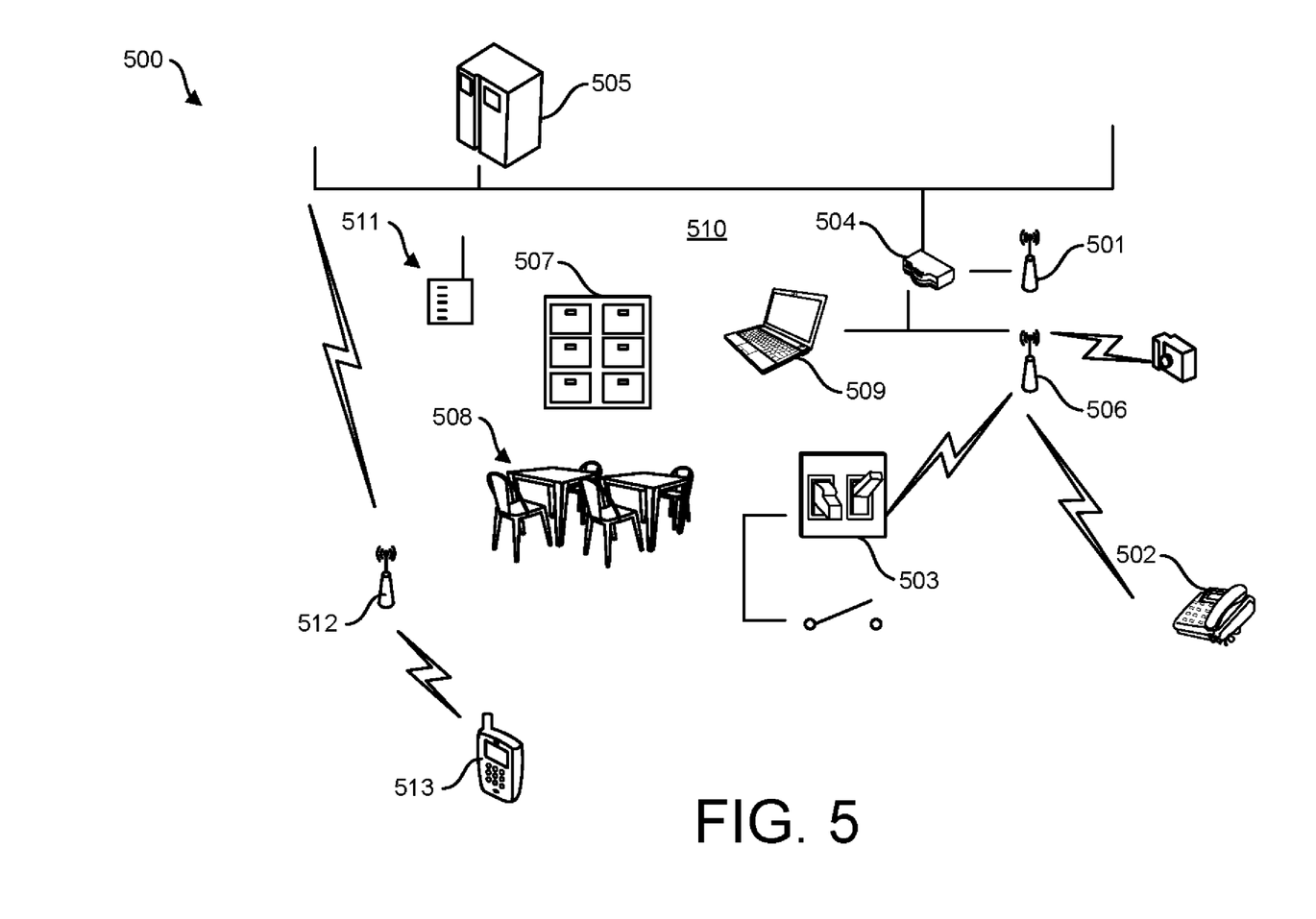
FIG. 5 is an illustration of an example internet-of-things topology which implements a dynamic network management system according to one implementation of the present disclosure.

FIG. 5 is an illustration of an example internet-of-things topology 500 which implements a dynamic network management system according to one implementation of the present disclosure. The Internet-of-Things topology 500 includes several IoT devices within a deployment area 510. The topology 500 of IoT devices may include access points 501, 506, office phones 502, utility devices (e.g., light switch 503), router 504, file cabinet(s) 507, desk set(s) 508, and a laptop computer 509. In addition, the topology 500 of IoT devices may include appliances (e.g., microwave oven, refrigerator), and other devices that are typically present within a deployment area. Those having ordinary skill in the art may appreciate that the aforementioned IoT devices are exemplary and therefore the present disclosure is not limited thereto. For the sake of RF planning, the trained predictive model may assume a minimal level of RF in a deployment area 510 depending on the deployment type (e.g., home or business wireless network system deployments).

In some implementations, non-electronic devices within the deployment area 510 such as office items (e.g., file cabinet 507 and desk set 508) may be equipped with sensors to transmit state information to access points 501, 506 or other network device. For example, the access points 501, 506 communicates information regarding the presence of the IoT devices within the deployment area 510. In an event that any of the IoT devices change positions within the deployment area 510 or are removed from the deployment area 510 altogether, a network server 505 can employ a machine-learning software application to determine whether the present number and layout of the access points 501, 506 are suitable for the present configuration of IoT devices therein.

In addition, the deployment area 510 may be equipped with a RF detector 511 which can detect RF signals and the like. The RF detector 511 may be connected to a network device which can transmit a level of RF signals detected in the deployment area. If the degree of RF signals exceeds a threshold level, the trained predictive model may be employed to determine whether the present number and layout of the access points 501, 506 within the deployment area are suitable for the present configuration of IoT devices therein.

Likewise, if the degree of RF signals falls below a threshold level for a certain period of time (e.g., two months), the trained predictive model may send a notification to an administrator that one or more access points may be removed if the degree of wireless activity fails to justify the present number of access points within the deployment area 510.

Moreover, the degree of RF signals detected by the RF detector 511 or other the change in the set of characteristics or attributes causes the trained predictive model to generate an updated analysis of the suitability of a RF plan may determine that the APs need to change their locations within the deployment area 510.

In some implementations, the RF detector 511 can also determine the number and range of client devices that are presently operating within the deployment area 510. Accordingly, the RF detector 511 can determine the user density within the deployment area 510 and then convey such information to the network server 505 by way of an intervening network device 504.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present disclosure. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A computing device comprising a display screen, at least one processor, and memory having machine readable instructions stored thereon when executed causes the computing device to be configured to determine a suitability of a radio frequency (RF) plan, comprising:
   receiving uploads of RF plans associated with wireless network deployments which provided wireless network capability throughout each respective deployment area;
   storing the uploaded RF plans within a network storage cloud in an anonymized form such that a source of the RF plans is unknown to subsequent users of a predictive model, wherein the source comprises names, addresses, other indicia of ownership, or a combination thereof;
   categorizing each of the uploaded RF plans according one of a plurality of deployment area types; and
   training the predictive model with RF plans of the stored uploaded RF plans which are categorized as a particular deployment type of the plurality of deployment area types and associated with successful deployments of that particular deployment type.

2. The computing device of claim 1, employing the trained predictive model to determine the suitability of the RF plan based on the received input.

3. The computing device of claim 1, further comprising re-training the trained predictive model upon storing additional RF plans received after an initial training of the trained predictive model and employing the re-trained predictive model to determine the suitability of the RF plan based on the received input.

4. A computing device comprising a display screen, at least one processor, and memory having machine readable instructions stored thereon when executed causes the computing device to be configured to determine a suitability of a radio frequency (RF) plan, comprising:
   receiving input in a trained predictive model, wherein the received input comprises a set of characteristics associated with a deployment area which is to host a deployment of a wireless network;

employing the trained predictive model to determine the suitability of the RF plan based on the received input, wherein the employing comprises performing multivariate regression;

outputting a prediction of the employment of the trained predictive model;

monitoring the deployment area to detect a change in the set of characteristics associated with the deployment area; and based on a determination that the change in the set of characteristics associated with the deployment area renders a present number of access points (APs) and their layout superfluous for the wireless network, issuing a notification to an administrator to remove one or more of the APs from the wireless network.

5. The computing device of claim 4, wherein the received input in the trained predictive model includes a plurality of RF plans associated with successful deployments of wireless networks.

6. The computing device of claim 5, wherein the plurality of RF plans are uploaded to a cloud network management system.

7. The computing device of claim 6, further comprising instructions to re-train the trained predictive model upon receipt of a pre-determined addition of RF plans associated with wireless network deployments.

8. The computing device of claim 4, wherein the received input comprises at least one of a floor plan of the deployment area, a description of partitions within the deployment area, a user density inside of the deployment area, and a target degree of RF interference within the deployment area.

9. The computing device of claim 4, wherein the received input comprises a proposed RF plan.

10. The computing device of claim 4, further comprising instructions to employ the trained predictive model in an event that there is a change in the set of characteristics associated with the deployment area and outputting a new prediction.

11. The computing device of claim 4, wherein the set of characteristics associated with the deployment area comprises a target floor plan of the deployment area, a description of partitions of the deployment area, a target user density associated with the deployment area, wall attributes of the deployment area, an amount of RF interference within the deployment area, or a combination thereof.

12. The computing device of claim 4, further comprising instructions to:

based on a determination that the change in the set of characteristics associated with the deployment area renders the present number of APs and their layout unsuitable for the wireless network, generate a prediction of a suitable number, type, and layout of APs for the deployment area with respect to the change in the set of characteristics; and issue a notification to the administrator based on the generated prediction.

13. A computing device comprising a display screen, at least one processor, and memory having machine readable instructions stored thereon when executed by the at least one processor causes the computing device to:

receive input in a trained predictive model, wherein the received input comprises a set of characteristics associated with a deployment area which is to host a deployment of a wireless network;

employ the trained predictive model to determine a suitability of an RF plan based on the received input;

output a prediction of the employment of the trained predictive model;

monitor the deployment area to detect a change in the set of characteristics associated with the deployment area;

based on a determination that the change in the set of characteristics associated with the deployment area renders a present number of access points (APs) and their layout superfluous for the wireless network, issue a notification to an administrator to remove one or more of the APs from the wireless network; and based on a determination that the change in the set of characteristics associated with the deployment area renders the present number of APs and their layout unsuitable for the wireless network, generate a prediction of a suitable number, type, and layout of APs for the deployment area with respect to the change; and issue a notification to the administrator based on the generated prediction.

14. The computing device of claim 13, wherein the received input in the trained predictive model includes a plurality of RF plans associated with successful deployments of wireless networks.

15. The computing device of claim 13, wherein the plurality of RF plans are uploaded to a cloud network management system.

* * * * *